(12) United States Patent
Bergmann

(10) Patent No.: US 6,275,625 B1
(45) Date of Patent: Aug. 14, 2001

(54) OPTICAL MIRROR SWITCH USING A MICHELSON INTERFEROMETER

(75) Inventor: Ernest Eisenhardt Bergmann, Borough of Foutain Hill, Lehigh County, PA (US)

(73) Assignee: Agere Systems Optoelectronics Guardian Corp., Orlando, FL (US)

( * ) Notice: Subject to any disclaimer, the term of this patent is extended or adjusted under 35 U.S.C. 154(b) by 0 days.

(21) Appl. No.: 09/272,753

(22) Filed: Mar. 17, 1999

(51) Int. Cl.$^7$ ........................................................ G02B 6/26

(52) U.S. Cl. ................................................. 385/18; 385/39

(58) Field of Search .................... 385/18, 15–16, 385/39, 40, 130, 132; 356/345, 350, 346

(56) References Cited

U.S. PATENT DOCUMENTS 5,647,032 * 7/1997 Jutamulia ................................ 385/14

* cited by examiner

Primary Examiner—Frank G. Font
Assistant Examiner—Tu T. Nguyen
(74) Attorney, Agent, or Firm—Wendy W. Koba

(57) ABSTRACT

A Michelson interferometer optical mirror switch is formed to include an optical signal path adjustment arrangement to transform the switch between a first, "pass through" state and a second, "reflective" state. A pair of input optical signal paths are coupled into an optical beam splitter that thereafter directs 50% of each optical signal toward a mirror element. The reflected signals then pass back through the beam splitter. If the optical path lengths are equal, an optical signal entering a first signal port will be coupled into a second signal port (the "pass through" state). If the optical path lengths differ by an odd, half-wavelength amount, the reflected signals will be directed back into the optical signal port of origin (the "reflective" state).

21 Claims, 3 Drawing Sheets

OPTICAL MIRROR SWITCH USING A MICHELSON INTERFEROMETER

BACKGROUND OF THE INVENTION

The present invention relates to an optical mirror switch and, more particularly, to an optical mirror switch based upon an optical implementation of a Michelson interferometer.

Conventional electro-optical switches can be realized using a number of different waveguide, electrode, and substrate implementations. Two different designs are used in commercially available electro-optical switches; the Mach-Zehnder and the $\Delta\beta$ directional coupler. The Mach-Zehnder design is similar to that of a free-space, conventional Mach-Zehnder interferometer, except that the beam splitters/combiners are replaced by 3-dB directional couplers. Similar to the Mach-Zehnder, the first 3-dB coupler splits the incident signal into two signals, ideally of equal intensity. If a differential phase shift is introduced between these signals, then when they re-combine in the second 3-dB coupler, the ratio of power in the two outputs will be altered. Contrast ratios greater than 20 dB (e.g., 100:1) are routinely achieved in commercial devices. In the $\Delta\beta$ directional coupler switch, electrodes are placed directly over (or immediately next to) the coupler and an applied electric field functions to alter the power transfer between the two adjacent waveguides. The contrast ratios achieved with the $\Delta\beta$ directional coupler switch are comparable to those of the 3-dB coupler arrangement.

A "mirror" switch can be defined as an arrangement including a pair of bidirectional ports. In a first state of the mirror switch, the ports are directly coupled to each other (a "pass" state). In a second state (hereinafter referred to as the "reflective" state), the ports are de-coupled so that an input signal is directly reflected and then returned back through the same port, that is, an optical signal input into the first port would be reflected back into the first port and, optionally, an optical signal input into the second port would be reflected back into the second port.

SUMMARY OF THE INVENTION

The present invention relates to an optical mirror switch and, more particularly, to an optical mirror switch based upon an optical implementation of a Michelson interferometer.

In accordance with the present invention, the optical mirror switch comprises a conventional beam splitter, defined as including a set of four optical ports. One opposing pair of ports are defined as the "signal" ports for the mirror switch and are used to provide optical communication between these ports for the first, "pass through" state of the optical mirror switch. The remaining, opposing pair of ports are mirrored to form reflective surfaces at these locations, used to form the second, "reflective" state of the optical mirror switch. In general, an optical signal input at a first signal port will be "split" in half by the beam splitter, a first half directed to the first reflective port and the second half directed to the second reflective port. When the optical path lengths associated with the first reflective port and the second reflective port are equal (or differ by a multiple number of whole wavelengths), the two reflected optical signals will again pass through the beam splitter and thereafter "constructively" interfere with each other as they are coupled forward into the second ("exit") signal port of the device. Alternatively, if the path lengths between the signal port and reflective ports differ by $n\lambda/2$ ($n=\pm 1, \pm 3, \pm 5, \ldots$), "destructive" interference will occur in the forward direction, thus essentially "blocking" transmission between the two signal ports. However, "constructive" interference will occur back along the reflected path at the entrance to the first signal port, thus allowing the original input signal to be "reflected" back into its signal port of origin (thus providing the "reflective" state of the mirror switch).

In one embodiment the optical mirror switch may comprise a pair of optical fibers and associated focusing/collimating elements disposed along the two opposing paths of a beam splitter. A suitably oriented mirror element may be disposed along each remaining signal path of the beam splitter to form the complete device. The change in optical signal path length required to switch the device from its first, "pass through" state to its second, "reflective" state may be accomplished in a number of different ways, including but not limited to, physically moving one or both of the mirrors with respect to the beam splitter, tilting the beam splitter, or inserting an additional (transparent) element in one or both optical signal paths (functioning to either "speed up" or "slow down" the propagation of the optical signal along the path). In general, as long as the optical signal path lengths can be changed between "equal" (associated with the first, "pass through" state) and "$n\lambda/2$", $n=\pm 1, \pm 3, \pm 5, \ldots$, (associated with the second, "reflective" state), switching in accordance with the present invention will occur.

An alternative embodiment of the present invention comprises planar waveguides and an optical path length alteration arrangement disposed in the top surface of an optical substrate.

A complete understanding of these and other embodiments of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Figure 1:
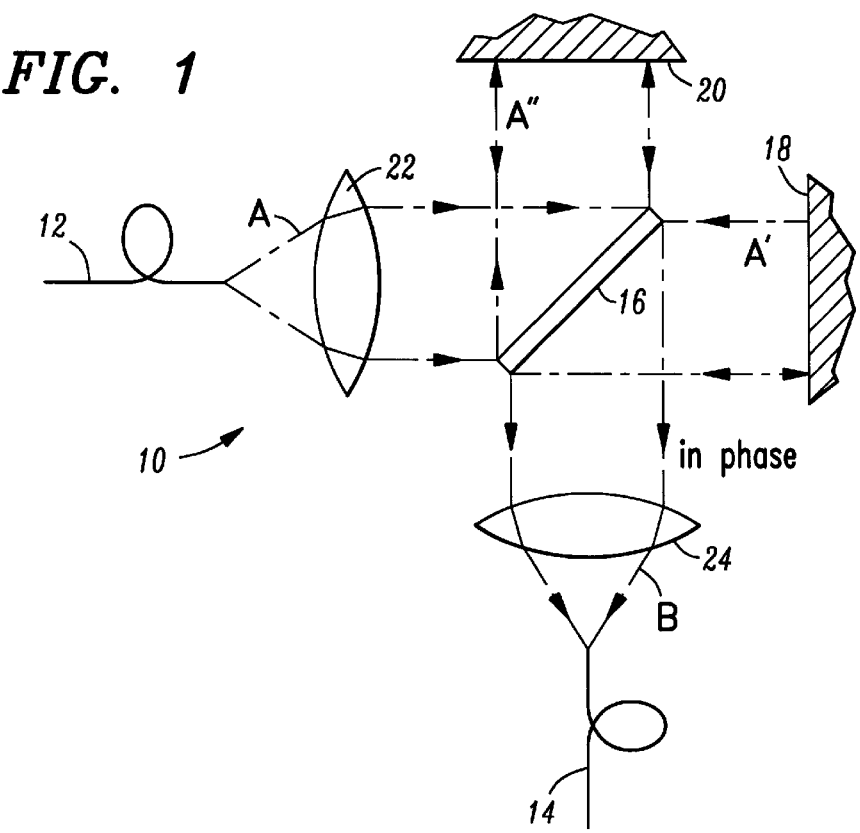
FIG. 1 illustrates an exemplary Michelson interferometer mirror switch of the present invention in the "pass through" state.

An exemplary Michelson interferometer mirror switch 10 of the present invention is illustrated in FIG. 1. In general, switch 10 functions between two states: (1) a "pass through"

state where the optical signal exiting a first optical signal port will be coupled into a second signal port (and vice versa); and; (2) a "reflective" state where the optical signal exiting the fist optical signal port will be re-coupled back into the same port. Referring to FIG. 1, switch 10 comprises a first optical signal path 12 and a second optical signal path 14, where these signal paths may comprise optical fibers, optical waveguides, or any combination of fibers, waveguides and other appropriate media for providing transmission of optical signals. For the purposes of the present discussion, paths 12 and 14 will be referred to as optical fibers, with the understanding that any of these other transmission media may also be used.

In the arrangement of the present invention as shown in FIG. 1, optical mirror switch 10 further comprises a beam splitter 16, where optical fibers 12 and 14 are used as the optical signal ports to beam splitter 16. A pair of reflective surfaces 18,20 are disposed as shown at the remaining two opposing ports (the reflective ports) associated with beam splitter 16. In the arrangement as depicted in FIG. 1, it will be presumed that the opposing paths between beam splitter 16 and reflective surfaces 18,20 are essentially equal so that the FIG. 1 exemplifies the "pass through" state of optical mirror switch 10. As discussed above, in the "pass through" state, an optical signal exiting fiber 12 will "pass through" switch 10 so as to be coupled into fiber 14. In particular, an optical signal A exits first fiber 12 at endface 12' and thereafter passes through a first lens 22 that functions to convert the diverging optical signal A into a collimated beam. Collimated beam A next impinges beam splitter 16, where beam splitter 16 is oriented to allow half of beam A to pass through unimpeded, while reflecting the remaining half (in the "upward" direction in FIG. 1). The transmitted half of the signal, denoted A' in FIG. 1, then impinges reflective surface 18, where surface 18 is disposed to be essentially orthogonal to the direction of propagation of beam A', allowing the signal to completely reflect upon itself. In a similar fashion, the reflected half of signal A, denoted A", will be directed toward, and then reflected by, reflective surface 20 (similarly disposed to be orthogonal to the direction of propagation of signal A").

As mentioned above, the various components forming optical mirror switch 10 are disposed in FIG. 1 so as to form equal optical signal path lengths between beam splitter 16 and reflective surfaces 18,20, respectively. The equality results in the reflected components A' and A" being "in phase" and, therefore, experiencing "constructive" interference as they reflect off of, and pass through (respectively) beam splitter 16 on their second pass between reflective surfaces 18,20 and beam splitter 16. That is, first component A', upon being redirected by first reflective surface 18, will again impinge beam splitter 16, with half of the component A' being reflected "downward" (toward fiber 14), and half being transmitted back toward first fiber 12. Similarly, second component A", after being redirected by second reflective surface 20, will again impinge beam splitter 16, with half of component A" being transmitted "downward" (toward fiber 14) and half being transmitted back toward first fiber 12. With the equality of optical signal path lengths properly established, the components of A' and A" propagating toward second fiber 14 will be in phase ("constructively" interfere) so that they will add together and form an output signal substantially equal to (albeit slightly reduced in power from as a result of, for example, imperfections in coupling, scattering, etc.) the original signal A exiting fiber 12. The components of A' and A" propagating back toward first fiber 12 will be, approximately 180° out of phase (thus experience "destructive" interference), so as to cancel each other out and essentially eliminate any signal from being coupled back through lens 22 and into first fiber 12.

It is to be understood that optical mirror switch 10 is "reciprocal" in its functionality. That is, an optical signal B exiting second fiber 14 will be split (after being collimated by a lens 24 disposed in the signal path as shown) and reflected in the manner described above. Accordingly, as long as the optical signal path lengths are equal (as depicted in the arrangement of FIG. 1), optical signal B will "pass through" switch 10 and thereafter be coupled into first fiber 12. It is to be noted that instead of being equal, the optical signal path lengths may differ by an integer number of wavelengths to provide the "pass through" state of the mirror switch.

Figure 2:
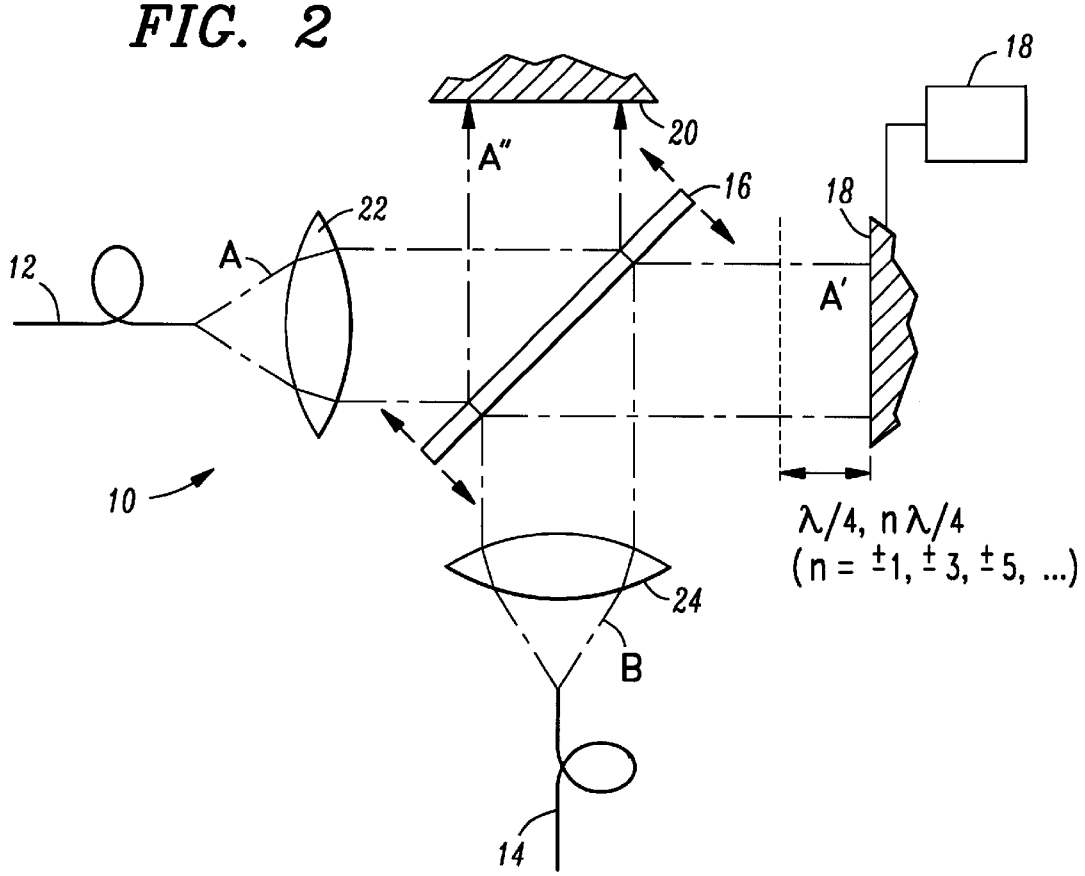
FIG. 2 illustrates an exemplary Michelson interferometer mirror switch of the present invention in the "reflective" state.

In accordance with the present invention, switch 10 may be converted to its second, "reflective" state by adjusting one (or both) of the signal paths so as to create an "odd, half-wavelength" optical signal path length difference between the two paths (i.e., $\Delta = n\lambda/2$, $n = \pm 1, \pm 3, \pm 5, \pm 7 \ldots$, $\Delta$ being defined as the difference in optical path lengths and $\lambda$ as the optical wavelength). FIG. 2 contains an illustration of switch 10 in the "reflected" state with different optical path lengths formed in accordance with the present invention. In the exemplary embodiment of FIG. 2, the odd half-wavelength is introduced into switch 10 by moving first reflective surface 18, such as via a motor 19, a distance of $\lambda/4$ further to the right. This same state of switch 10 could have been affected by moving second reflective surface 20 a distance "upward" associated with an additional $\lambda/4$ (or any suitable "odd" quarter-wavelength). Alternatively, both surfaces could have been moved by predefined amounts sufficient to add to the requisite quarter wavelength difference. In a different embodiment, beam splitter 16 may be translated, as indicated by the arrows in FIG. 2, to introduce the optical path length difference. Indeed, any arrangement capable of introducing the necessary "odd half-wavelength" (in the "round trip" path) may be used in accordance with the present invention. As an alternative to moving the mirrors outward, one or both could have been moved inward to provide the desired change in optical signal path length.

In the "reflective" state of optical mirror switch 10 as shown in FIG. 2, optical signal A still exits fiber 12, is collimated by lens 22 and thereafter impinges beam splitter 16. As with the arrangement discussed above, a first component of optical signal A (denoted A') will be transmitted through beam splitter 16, while a second (essentially equal) component A" will be reflected (directed "upward" in the illustration of FIG. 2). First component A' of optical signal A that passed through beam splitter 16 will now propagate an additional $\lambda/4$ distance before impinging first reflective surface 18. The reflected signal will also traverse the additional $\lambda/4$ distance before re-entering beam splitter 16. Therefore, first component A' will now be delayed by (approximately) 180° when compared with second component A". This delay results in the portions of components A' and A" that are directed toward fiber 14 to now "destructively" interfere (in contrast to the "constructive" interference associated with the arrangement of FIG. 1) so that essentially no signal will be coupled into fiber 14. Instead, the components of signal A directed back toward first fiber 12 will now "constructively" interfere (in contrast to the "destructive" interference associated with the arrangement of FIG. 1), allowing for these components to provide an output signal back into fiber 12 (thus, the "reflective" state of switch 10). In a similar manner, an input signal B from second fiber 14 would also be "reflected" through switch 10—arranged as shown in FIG. 2—back into fiber 14.

Figure 3:
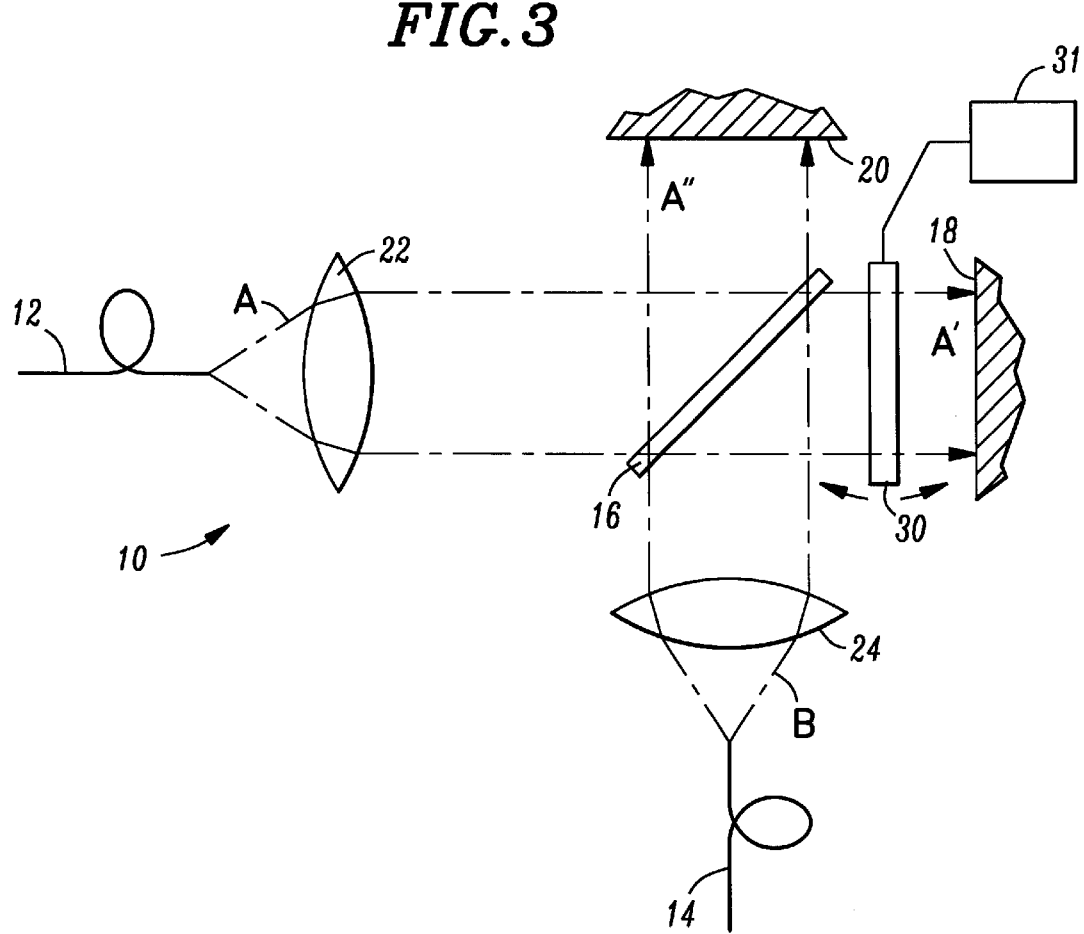
FIG. 3 illustrates an alternative Michelson interferometer mirror switch of the present invention utilizing an additional transparent member to provide switching between the "reflective" and "pass through" states.

FIG. 3 illustrates an alternative arrangement of the present invention that utilizes a separate transparent member 30 to modify the signal path lengths in one of the two arms to alternate the between the "pass through" and "reflective" states. As shown in FIG. 3, transparent member 30 is disposed in the signal path between beam splitter 16 and reflective surface 18. Transparent member 30, which may simply be a glass plate, is formed to comprise a thickness t that will introduce an additional odd $n\lambda/2$ delay (round trip) in signal propagation along the path. In this embodiment, transparent member 30 may be moved into and out of the signal path, via, for example, a motor 31, to effect the changes in switch state. Alternatively, transparent member 30 may be tilted (via motor 31), as indicated by the arrows in FIG. 3, to cause the required changes in optical path length. In this embodiment, reflective surfaces 18 and 20 are maintained in their "pass through" positions, as shown in FIG. 1. In an alternative embodiment, a pair of transparent members may be used, each capable of introducing an odd quarter wavelength one-way path difference. Other combinations of plates and mirror positions, either alone or with the above-described movement of the reflective surfaces, may be used to introduce the required change in optical path length to form the Michelson interferometer mirror switch in accordance with the present invention. In a preferred embodiment, it is desirous to make the optical path lengths in the two arms nearly equal so that the wavelength dependence of the phase difference as small as possible.

Figure 4:
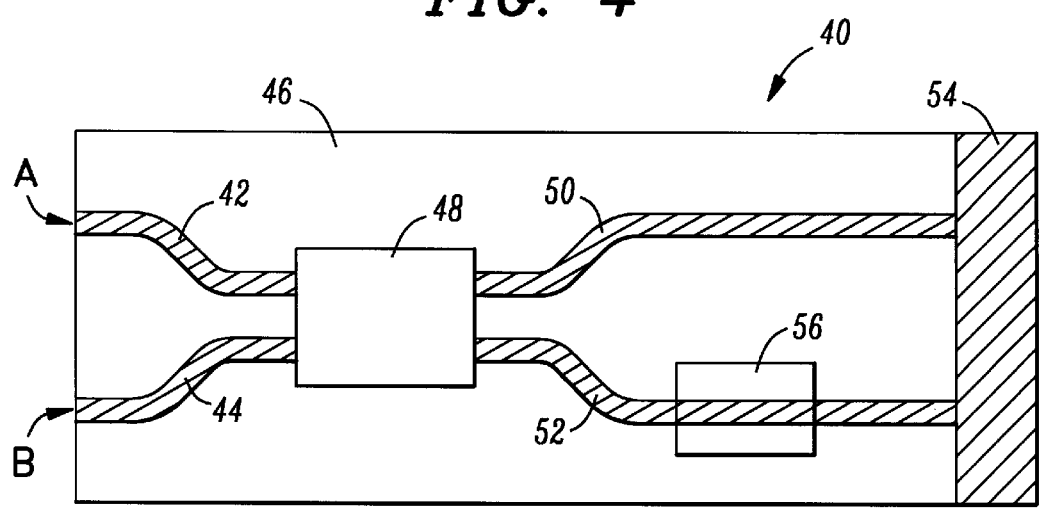
FIG. 4 illustrates a planar waveguide Michelson interferometer mirror switch of the present invention.

As mentioned above, a Michelson interferometer mirror switch of the present invention may also be formed using planar waveguide components. FIG. 4 illustrates a mirror switch 40 formed as such a planar waveguide structure. First and second optical waveguides 42 and 44 are formed, as shown, in the top surface of an optical substrate 46. Waveguides 42 and 44 both couple into a beam splitter region 48 in the top surface of substrate 46. There are many ways to form such a beam splitter in integrated optics. For example, a 3 dB directional coupler may be formed as beam splitter region 48. A directional coupler consists of having the two waveguides so close that the mode associated with one waveguide has some overlap with the other waveguide; by having the two waveguides so close over a suitable distance, light can "leak" from one guide into the other guide. Alternatively, appropriate portions of waveguides 42 and 44 may be physically combined to form a common waveguide region. Various other alternatives are possible, and all are considered to fall within the spirit and scope of the present invention. Exiting beam splitter region 48 are a pair of waveguides 50 and 52, where in accordance with the present invention each waveguide will carry approximately 50% of an optical signal applied as an input to either waveguide 42 or 44. A reflective surface 54 is disposed along the edge surface of substrate 46 at the output of waveguides 50,52. Without further modification to the arrangement discussed thus far, the optical path lengths of each "branch" of the arrangement of FIG. 4 are essentially equal, allowing this arrangement of switch 40 to be defined as the "pass through" state of switch 40, for the reasons discussed above.

In operation, an optical signal A entering waveguide 42 will be "split" within beam splitter region 48 so that approximately half of the signal will exit along waveguide 50 and the other half of the signal will exit along waveguide 52. These components will thereafter propagate along waveguides 50,52 and reflect off of reflective surface 54. The signals will then be coupled back into waveguides 50,52, respectively, and re-enter beam splitter 48. In the "pass through" state of switch 40 (i.e., equal optical path lengths), beam splitter 48 will function to re-combine these signals and direct them into waveguide 44. In accordance with the reciprocal nature of the mirror switch of the present invention, switch 40 will function similarly with an input optical signal B entering waveguide 44 (that is, in the "pass through" state, input optical signal B will "pass through" switch 40 and be coupled into waveguide 42.

The "reflective" state of switch 40 is effected by modifying the difference between the optical path lengths of waveguides 50 and 52. In the embodiment as shown in FIG. 4, this difference may be introduced (or, alternatively, removed) using an optical path length control arrangement 56 disposed proximate to waveguide 52. In the case of silica waveguides on a silicon substrate, control arrangement 56 may comprise a metal pad that can be heated to cause a predictable change in optical path length through that portion of waveguide 52. When using lithium niobate waveguides, arrangement 56 may introduce an electric field in the vicinity of arrangement 56. Alternatively, optical path length control arrangement may be disposed over waveguide 50 (or, indeed, separate arrangement disposed over each waveguide). In any of these arrangements, arrangement 56 is controlled to provide the "reflective" state and add the desired "odd, half-wavelength" round trip optical path length different between waveguides 50 and 52. The change of this optical path length along one waveguide results in an optical signal introduced into waveguide 42 to be "reflected" through switch 40 so as to re-enter waveguide 42 after propagating through the switch. That is, an optical signal A input into waveguide 42 that experiences the introduced signal path difference will be directed by beam splitter 48 back into waveguide 42 when the reflected signal returns. Similarly, an optical signal B input into waveguide 44 will traverse switch 40 and be re-directed back into waveguide 44 at its output (i.e., the "reflective" state of planar waveguide switch 40).

Figure 5:
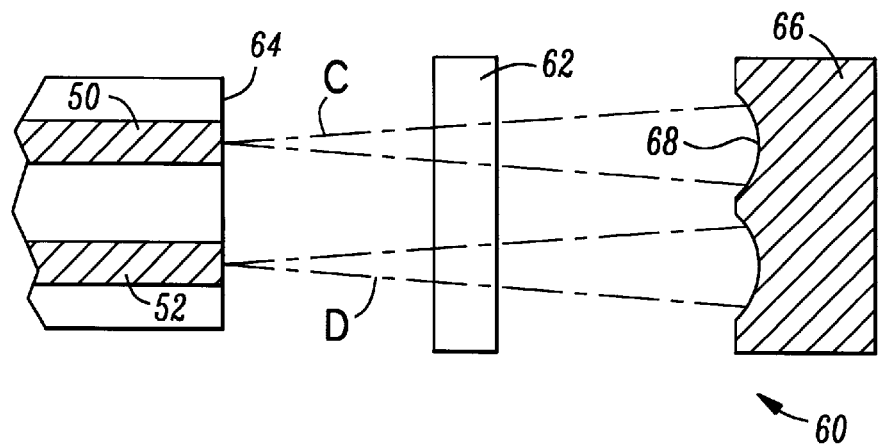
FIG. 5 illustrates an alternative planar waveguide embodiment of the present invention, using a Faraday rotator and external mirror component.

In its simplest form, reflecting arrangement 54 of switch 40 may comprise a high reflectivity coating applied to the endface of substrate 46. However, if there is a considerable amount of birefringence present in the propagating optical signals (due to the waveguides, beam splitter, or a variety of other factors) an alternative reflection system may be used to reduce (essentially eliminate) the effects of this birefringence. FIG. 5 illustrates an exemplary planar mirror switch 60 that includes a separate 45° Faraday rotator 62 and refocusing mirror element 66. As with the arrangement described above in association with FIG. 4, switch 60 comprises a pair of input waveguides 42,44, a beam splitter 48, output waveguides 50,52 and path length control arrangement 56. In switch 60, however, reflective surface 54 has been eliminated and replaced by Faraday rotator 62 and refocusing mirror element 66. In the embodiment of switch 60, a first optical signal C exiting waveguide 50 will comprise both TE and TM polarization components. The TE component will be rotated 45° in each pass through Faraday rotator 62 and will therefore re-enter waveguide 50 as a TM polarized component. Similarly, the initial TM polarization component will be twice rotated and re-enter waveguide 50 as a TE polarized component. Similarly, a second optical signal D exiting waveguide 52 will have its TE and TM components interchanged as they pass through Faraday rotator 62 and refocusing mirror surface 66. The conversion will thus essentially cancel the effects birefringence that either waveguide would otherwise exhibit. The utilization of appropriately curved surfaces 68 on refocusing mirror surface 66 eliminates the need for separate lensing elements to insure that the optical signal impinging mirror surface is properly re-focused back through Faraday rotator 62. As an alternative to Faraday rotator 62, a quarter-wave birefringent plate, oriented at 45° with respect to the TE/TM directions can be used. Combined with its reflection, such a plate is effectively a half-wave birefringent plate that also functions to interchange the TE and TM polarization states.

Figure 6:
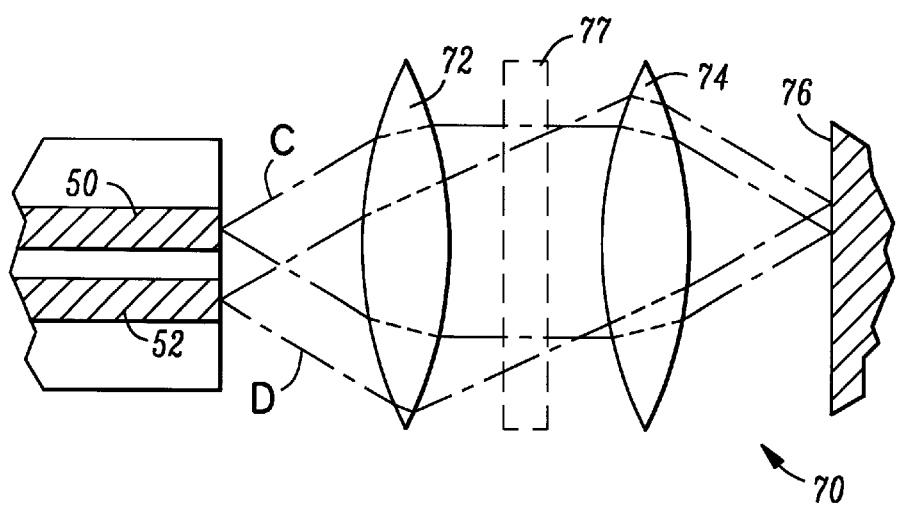
FIG. 6 illustrates an alternative arrangement of the embodiment illustrated in FIG. 5, using separate external lensing elements and an (optional) Faraday rotator.

Various other arrangements exist to return the reflected signal back into waveguides 50,52. FIG. 6 illustrates an alternative planar reflective switch 70 including a -pair of lenses 72,74 to provide for the necessary collimation and focusing operations. Referring to FIG. 6, first optical signal C exiting waveguide 50 exits as a divergent beam. First lens 72 functions to convert signal C into a collimated beam, which thereafter passes through second lens 74 and is focused onto a reflective surface 76. In the return mode, the reflected (divergent) signal will be collimated by second lens 74, pass through first lens 72 and be re-focused into waveguide 50 (and thus returned). As with the other planar arrangements, the "state" of switch 70 is controlled by the operation of optical path length control arrangement 56 (illustrated in FIG. 4) to modify the relative optical path length of waveguides 50,52 and therefore allow beam splitter 48 to control the coupling of the return signal between waveguides 40 and 42. In a similar manner, optical signal D exiting waveguide 52 will similarly pass through lenses 72,74, reflect off reflective surface 76 and be returned and re-focused back into waveguide 52. As an alternative to path length control arrangement 56 resident within the optical substrate, a path control plate (or, alternatively a Faraday rotator 77 as shown in phantom) may be disposed in the signal paths anywhere between the substrate and mirror 76 (preferably between lenses 72 and 74). In this instance, the two collimated paths will then form an angle with one another, changing the relative amount of delay between the paths. In a different embodiment, reflective surface 76 may also be "twisted" to change the path lengths for the pair of signals to provide the two different states for the switch.

Figure 7:
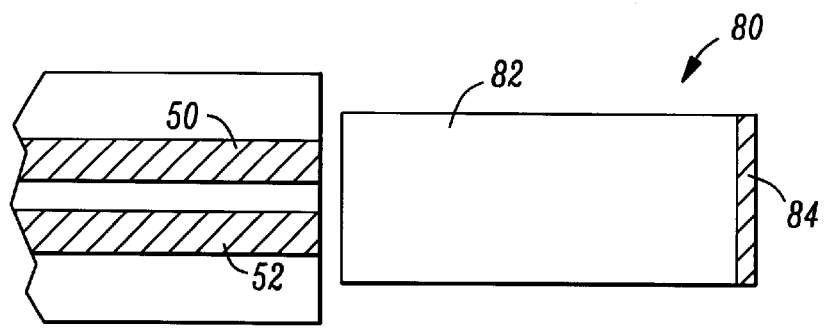
FIG. 7 illustrates an alternative planar waveguide embodiment of the present invention, including an external GRIN lens and mirror element.

FIG. 7 illustrates an alternative embodiment of a Michelson interferometer mirror switch in accordance with the present invention. In this embodiment, an interferometer mirror switch 80 uses a reflective arrangement comprising a GRIN lens 82 with a reflective end surface 84. GRIN lens 82 may be a half-pitch lens, an n/2 (n=1,2,3, . . . ) pitch, or any other appropriate arrangement to provide the proper coupling between waveguides 50,52 and reflective end surface 84.

It is to be understood that all of the arrangements described above are exemplary; there exist many other Michelson interferometer mirror switches of the present invention (either formed of discrete components or of a planar implementation) that are considered to fall within the scope of the invention as defined by the appended claims.

What is claimed is:

1. An optical mirror switch for operating between a first, "pass through" state and a second, "reflective" state, said switching comprising a pair of optical signal ports;

a pair of reflective optical ports;

an optical beam splitter disposed between said pair of signal ports and said pair of reflective ports; and an optical path length adjusting arrangement disposed in at least one optical signal path between said optical beam splitter and a reflective port of said pair of reflective optical signal ports to provide switching between equal optical path lengths for the first, "pass through" state of said switch and unequal optical path lengths for the second, "reflective" state of said switch, the unequal optical path lengths defined as an odd, half-wavelength amount nλ/2, where n=±1, ±3, ±5, . . . and λ is the optical signal wavelength.

2. An optical mirror switch as defined in claim 1 wherein the switch further comprises first and second optical fibers as inputs tote pair of signal ports.

3. An optical mirror switch as defined in claim 1 wherein the switch further comprises first and second optical waveguides as inputs to the pair of signal ports.

4. An optical mirror switch as defined in claim 1 wherein the optical path length adjusting arrangement comprises a device for moving a reflective port with respect to the beam splitter, said moving device changing the optical path length by an additional odd, half-wavelength optical path length to form the second, "reflective" state of said mirror switch.

5. An optical mirror switch as defined in claim 4 wherein the moving device is disposed between a first reflective port of said pair of reflective ports and the beam splitter, said moving device being formed to increase the optical path length by an odd, half-wavelength amount.

6. An optical mirror switch as defined in claim 4 wherein the moving device is disposed between a first reflective port of said pair of reflective ports and the beam splitter, said moving device being formed to decrease the optical path length an odd, half-wavelength amount.

7. An optical mirror switch as defined in claim 4 wherein the moving device is disposed between a second reflective port of said reflective ports and the beam splitter, said moving device being formed to increase the optical path length an additional odd, half-wavelength amount.

8. An optical mirror switch as defined in claim 4 wherein the moving device is disposed between a second reflective port of said pair of output ports and the beam splitter, said moving device being formed to decrease the optical path length an additional odd, half-wavelength amount.

9. An optical mirror switch as defined in claim 1 wherein the optical path length adjusting arrangement comprises a transparent member of a predetermined thickness disposed in an optical signal path to change the optical signal path length by an odd, half-wavelength amount.

10. An optical mirror switch as defined in claim 9 wherein the transparent member comprises a birefringent plate exhibiting a quarter-wavelength differential polarization path length.

11. An optical mirror switch as defined in claim 1 wherein the optical path length adjusting arrangement comprises a rotation device for changing an optical path length by an odd, half wavelength amount.

12. An optical mirror switch as defined in claim 1, said switch formed as a planar device on an optical substrate wherein each optical signal path comprises an optical waveguide formed within said optical substrate.

13. An optical mirror switch as defined in claim 12 wherein the optical beam splitter comprises a 3 dB optical directional coupler.

14. An optical mirror switch as defined in claim 12 wherein the optical beam splitter comprises a combined region of each optical waveguide.

15. An optical mirror switch as defined in claim 12 wherein the optical path length adjusting arrangement comprises an electrode disposed proximate to a portion of at least one waveguide disposed between a reflective port of the mirror switch and the beam splitter.

16. An optical mirror switch as defined in claim 12 wherein the pair of reflective ports comprises a reflective coating disposed on an end surface of the optical substrate at the termination of the optical waveguides.

17. An optical mirror switch as defined in claim 12 wherein the pair of reflective ports comprises a polarization interchanger and focusing reflective surface disposed beyond the optical substrate.

18. An optical mirror switch as defined in claim 17 wherein the polarization interchanger comprises a 45° Faraday rotator.

19. An optical mirror switch as defined in claim 17 wherein the polarization interchanger comprises a quarter-wave plate oriented at approximately 45° with respect to the reflective surface.

20. An optical mirror switch as defined in claim 17 wherein the polarization interchanger comprises a birefringent plate.

21. An optical mirror switch as defined in claim 12 wherein the pair of reflective ports comprises a lensing arrangement and reflective surface disposed beyond the optical substrate.

* * * * *